United States Patent [19]

Saccardo et al.

[11] Patent Number: 5,598,463
[45] Date of Patent: Jan. 28, 1997

[54] REMOTE TERMINAL FOR CENTRAL DICTATING SYSTEM

[76] Inventors: John Saccardo, 5 Fieldcrest Ter., North Reading, Mass. 01864; Daniel Collins, 27A Cove Ave., Framingham, Mass. 01701

[21] Appl. No.: 322,002

[22] Filed: Oct. 12, 1994

[51] Int. Cl.⁶ .................................................. H04M 11/00
[52] U.S. Cl. .................................................. 379/97; 379/75
[58] Field of Search ............................ 379/97–99, 90, 379/110, 67, 73–77; 369/24, 25

[56] References Cited

U.S. PATENT DOCUMENTS

| | | | |
|---|---|---|---|
| 3,872,263 | 3/1975 | Wilder et al. | 369/25 |
| 4,122,305 | 10/1978 | Fish et al. | 379/75 |
| 4,677,658 | 6/1987 | Kolodny et al. | 379/75 |
| 4,817,127 | 3/1989 | Chamberlin et al. | 379/67 |
| 4,955,051 | 9/1990 | Sato | 379/75 |
| 4,975,896 | 12/1990 | D'Agosto, III et al. | 379/75 |
| 5,033,077 | 7/1991 | Bergeron et al. | 379/75 |
| 5,265,075 | 11/1993 | Bergeron et al. | 379/75 |

*Primary Examiner*—Wing F. Chan
*Attorney, Agent, or Firm*—Cesari and McKenna

[57] ABSTRACT

A control unit, connected to a telephone, sends tone signals to a central dictating/recording unit in response to a user pressing buttons on an auxiliary keypad. The auxiliary keypad, in the form of a thin, membrane-type switch unit, adheres to the back of the telephone handset. A substitute coil cord has additional conductors and connects the telephone handset and the auxiliary keypad to the control unit. In response to the user pressing a button on the auxiliary keypad, the control unit simulates the user pressing one or more buttons on the telephone dial by sending the appropriate series of DTMF tones to the dictating/recording unit. The user can reprogram the simulated series of telephone dial button presses sent in response to any auxiliary keypad button being pressed, released, and "clicked" (pressed and then quickly released).

3 Claims, 11 Drawing Sheets

REMOTE TERMINAL FOR CENTRAL DICTATING SYSTEM

BACKGROUND OF THE INVENTION

1. Field of the Invention

This invention relates to a remote dictation system. More particularly, it relates to improvements in dictation systems of the type that use ordinary telephones to dictate into a remote central recording unit (also called a host unit) and to retrieve recorded material therefrom.

The systems to which this invention relates are particularly useful in medical applications. A radiologist, for example, may dictate his observations to a central recording unit by means of a conventional telephone handset while viewing an X-ray photograph of a patient. A referring physician can later access the recorded report from another site, again by means of a telephone located at that site. The DTMF push-buttons on the telephones are used to transmit digits that identify the recordings and the physicians. The buttons also provide signals that control the usual voice recording functions such as record, playback, and rewind.

2. Brief Summary of the Invention

The principal object of the present invention is to enhance the ease of use of these recording systems. A more specific object is to facilitate the generation of control signals by the user. Another object is to make it easier for the user to deal with central recording units having different control protocols. A further object is to enable the central recording unit to detect the end of a recording or playback session as soon as the user has terminated it.

The invention is embodied primarily in a control unit connected to the user's telephone. An auxiliary keypad in the form of a thin, membrane-type switch unit adheres to the back of the user's handset at the receiver end thereof. A conductor pair from this switch extends to a substitute coil cord that replaces the coil cord originally connected between the handset and the telephone's base unit. The other end of this substitute cord plugs into the control unit, as does a line extending from the telephone base unit receptacle that ordinarily connects to the handset. Another line extends from the control unit to the telephone base unit jack that ordinarily connects to the telephone line. The telephone line, in turn, plugs into a receptacle in the control unit. The invention can be connected to a telephone without violating the integrity of the telephone because all the connections use existing quick-disconnect-type jacks in the telephone base and handset.

The control unit connects the voice wires from the handset directly to the corresponding connector in the telephone base unit. It also connects the telephone base unit to the telephone line, but by way of a "line sense and disconnect unit" that controls connection of the control unit and the telephone base unit to the telephone line.

In the preferred embodiment of the invention, the control unit has three modes of operation, selectable by means of a front panel switch. In an off mode, the telephone operates as a conventional telephone, with the telephone base unit connected to the telephone line. In a session mode, used for dictation to, and playback from, the host recording unit, the control unit activates the auxiliary keypad attached to the telephone handset and the control unit transmits, over the telephone line, tone signal(s) indicative of the respective buttons therein actuated by the user. Each tone signal is a DTMF signal that could otherwise be generated by a telephone in response to a user pressing a button on the telephone's dial. The control unit sends one or more tone signals in response to the user pressing a button on the auxiliary keypad. The tone signal(s) sent by the invention simulate to a central recording unit a user pressing a series of buttons on the telephone dial. Hereinafter, the "value" of an auxiliary keypad button is the series of button presses on a telephone dial that the invention simulates after a user presses, releases, or "clicks" (momentarily presses then releases) the button on the auxiliary keypad.

A third mode is a program mode in which the user can select the various functions that are activated by actuation of the respective buttons on the auxiliary keypad, i.e. the user can change the "value" of the buttons on the auxiliary keypad. The control unit prompts the user by generating voice messages and injecting them into the line to the telephone base unit. In this mode, the telephone and control unit are disconnected from the telephone line.

The line sense and disconnect unit serves an important function relating to release of telephone lines by the central recording unit. A user terminates a session with the central recording unit by going on-hook. In prior systems, the central recording unit would determine that a user has gone on-hook by waiting a predetermined length of time during which no signals are received from the user. This length of time has to be fairly substantial in order to prevent the central recording unit from disconnecting a user who has merely paused longer than usual in recording a message or in transmitting control signals to the central recording unit. This unduly ties up central recording unit ports and telephone lines at the central recording unit. In accordance with the present invention, the line sense and disconnect unit senses an on-hook condition in the telephone base unit, indicating the user has terminated a session, and then holds the telephone line and transmits a termination signal to the central recording unit before dropping the line. The central recording unit, in turn, holds the connection at its end until it receives a termination signal. In this way, the central recording unit can disconnect immediately upon termination of a session, without prematurely disconnecting because of a pause in a transmission by the user.

DESCRIPTION OF THE INVENTION

Brief Description of the Drawings

For a fuller understanding of the nature of the invention, reference should be had to the following detailed description taken in connection with the accompanying drawings, in which.

DETAILED DESCRIPTION OF THE INVENTION

Figure 1:
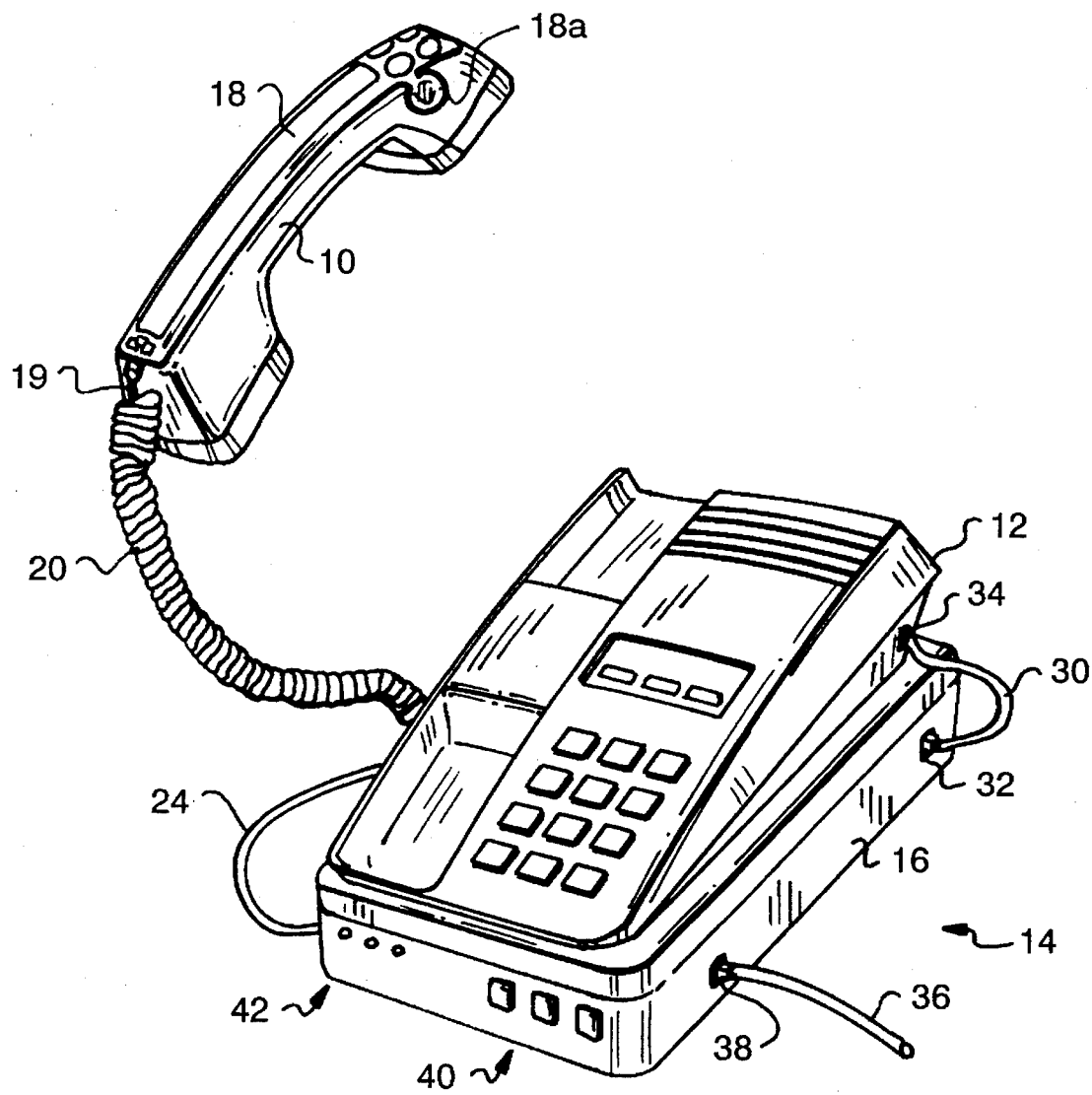
FIG. 1 depicts a terminal unit embodying the invention by which a user can engage in recording and playback sessions with a remotely located central recording unit.

As shown in FIG. 1 a terminal unit embodying the invention includes a conventional telephone comprising a handset 10 and a base unit 12. The telephone is connected to a control unit generally indicated at 14, whose parts (also shown in FIG. 4) include a housing 16, a membrane-type key pad 18 adhered to the back surface of the handset 10, and a coiled cord 20 that includes a pair of conductors 19 from the switch pad 18, as well as the conductors that usually extend from a handset to a telephone base unit. The cord 20 plugs into a jack 22 (FIG. 4) in the housing 16. A cord 24 interconnects a jack 26 (FIG. 4) in the housing 16 and a jack 28 (FIG. 4) in a base unit 12 into which the conventional coil cord from the handset 10 is usually plugged.

With further reference to FIG. 1, a cord 30 interconnects a jack 32 in the housing 16 and a jack 34 in the telephone base unit 12, which conventionally connects to the telephone line. Finally, a cord 36 connects a jack 38 in the housing 16 to the telephone line by means of a wall receptacle (not shown).

Front panel switches indicated at 40 are used to select the mode of operation of the control unit as described below, and panel lights 42 indicate that the unit is receiving electrical power, and also indicate the operating mode.

Figure 4:
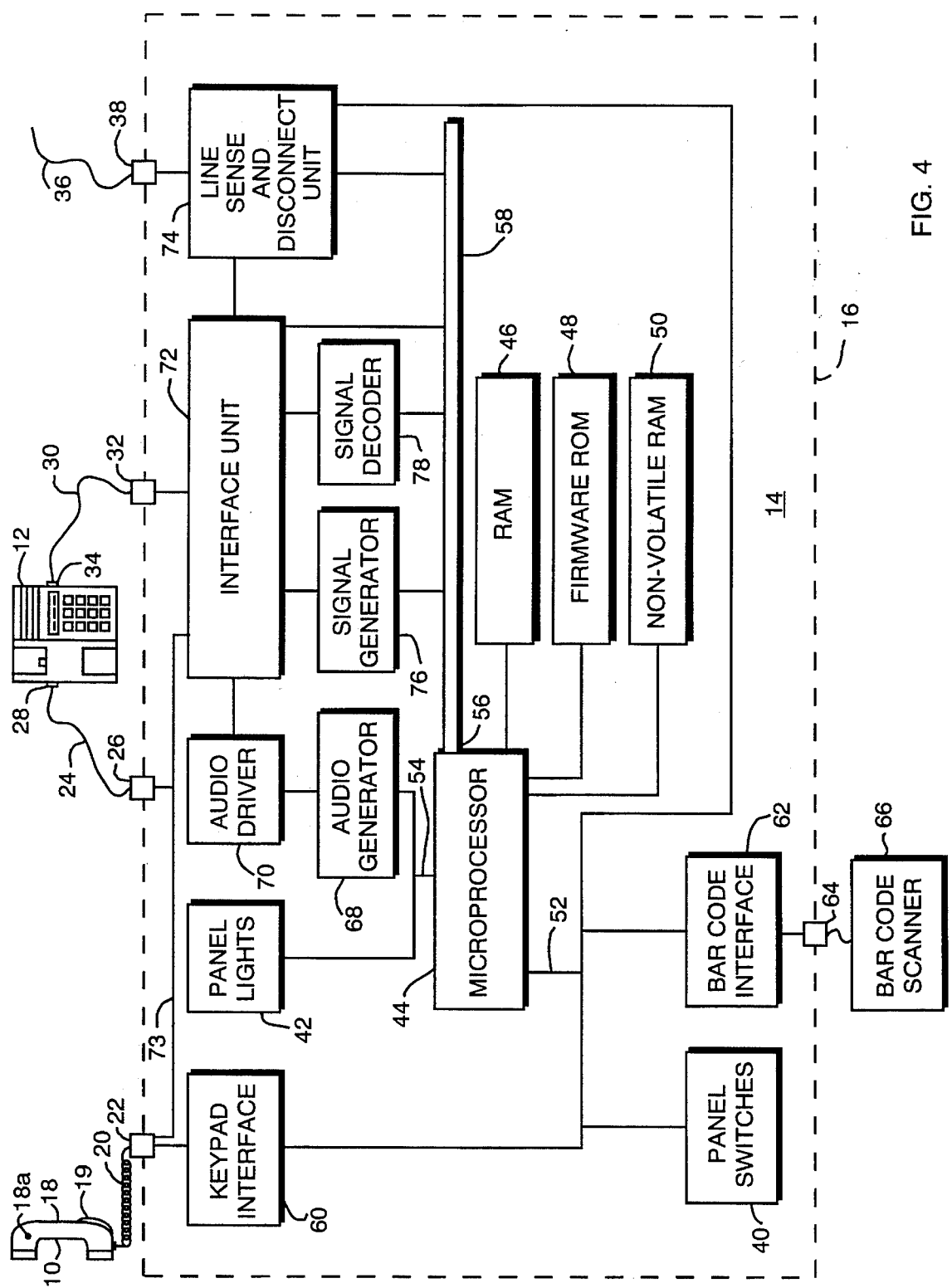
FIG. 4 is a schematic block diagram of the control unit.

As shown in FIG. 4, the control unit is enclosed in a housing 16 and contains a microprocessor 44 and associated components, including a random access memory (RAM) 46, a read only memory (ROM) 48 containing firmware, and a non-volatile random access memory 50. The microprocessor 44, which may by way of example be an Intel 8031 processor, includes input ports indicated at 52, output ports indicated at 54, and an I/O port 56 to which an I/O bus 58 is connected.

The input ports 52 receive inputs from a keypad interface 60, an optional bar code interface 62 and the panel switches 40. The keypad interface is connected to the jack 22 to provide a connection to the conductors 19 extending from the keypad 18. The bar code interface is connected to a jack 64 into which a bar code scanner 66 is plugged.

The output ports 54 are connected to drivers for the panel lights 42 and to an audio generator 68. The output of the audio generator is applied to an audio driver 70 whose output in turn is applied to an interface unit 72. The interface unit 72 is connected to the jacks 22, 26 and 32. The audio generator 68 generates voice prompts during the programming mode of operation and the user hears these prompts on the handset 10 by virtue of a connection from the driver 70 to the base unit 12.

As also shown in FIG. 4, a line sense and disconnect unit 74 is interposed in a path from the jack 32 to the jack 38. The unit 74 senses the hook state of the base unit 12 and transmits a corresponding signal to the microprocessor 44, by way of the I/O bus 58. The unit 74 also operates to disconnect the terminal from the telephone line 36 in response to signals received from the bus 58. The unit 74 further includes circuitry for holding the line 36 and preferably also circuitry for providing DC loop current to the telephone base unit 12.

Figure 2:
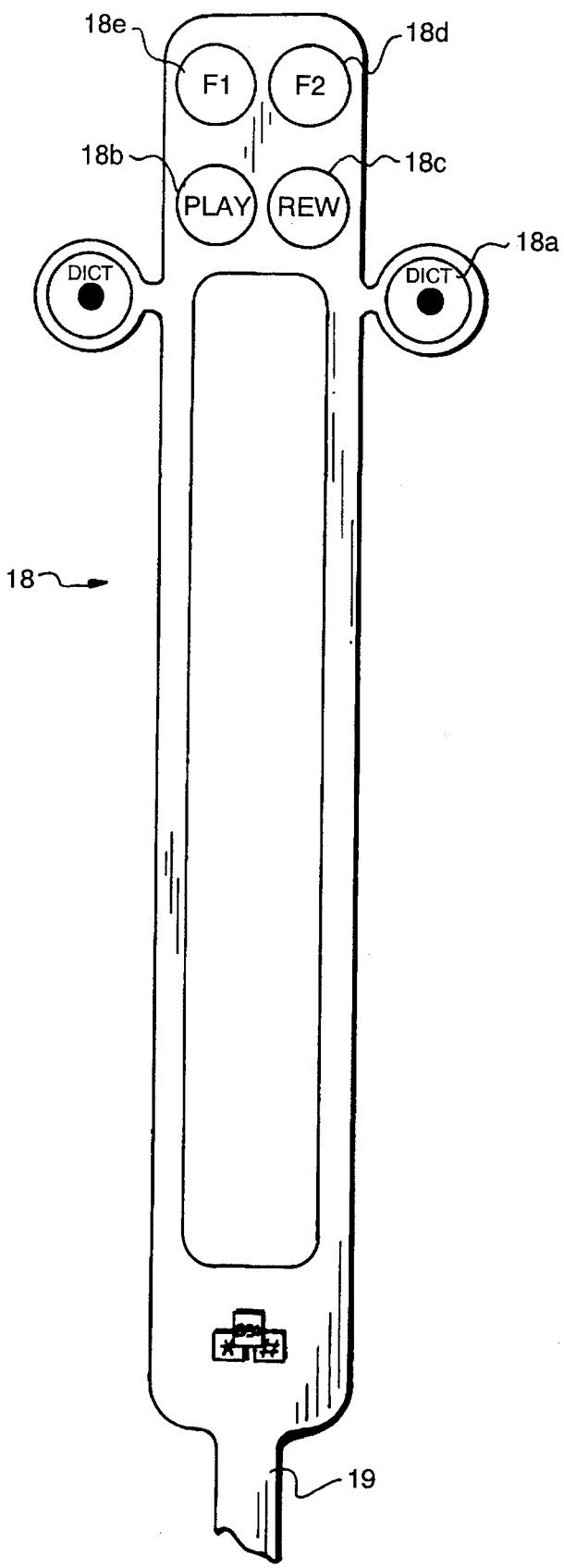
FIG. 2 depicts an auxiliary keypad, which adheres to the back of a user's handset, and with which a user issues commands to the central recording unit and to the control unit.

The keypad 18 (FIG. 2) is a thin membrane-type switch pad that is highly flexible and is provided on its rear surface with a suitable adhesive. It thus readily conforms to the rear surface of the handset 10, to which the user can readily adhere it. The illustrated switch pad has six switch buttons, each of which has a slightly raised surface so that the user can use his or her tactile sense to locate the button. Two of the buttons, one of which is indicated at 18a, are folded over to adhere to the side surfaces of the handset, where they are readily actuated by the right or left thumb of the user, depending on which hand is used to hold the handset. These two buttons may, for example, be used to initiate and interrupt or terminate dictation to the central recording unit. A button 18b is actuated to play back a previously recorded segment and a button 18c is actuated to initiate the rewind function at the host unit. Buttons 18d and 18e can be used for other functions. As described below, the functions provided by the buttons are programmable by the user. For example, the user may arrange to have dictation continue as long as a button 18a is actuated. Alternatively, a toggle function mode may be used wherein momentary actuation of a button 18a commences dictation and a second momentary actuation of the button terminates it.

Figure 3:
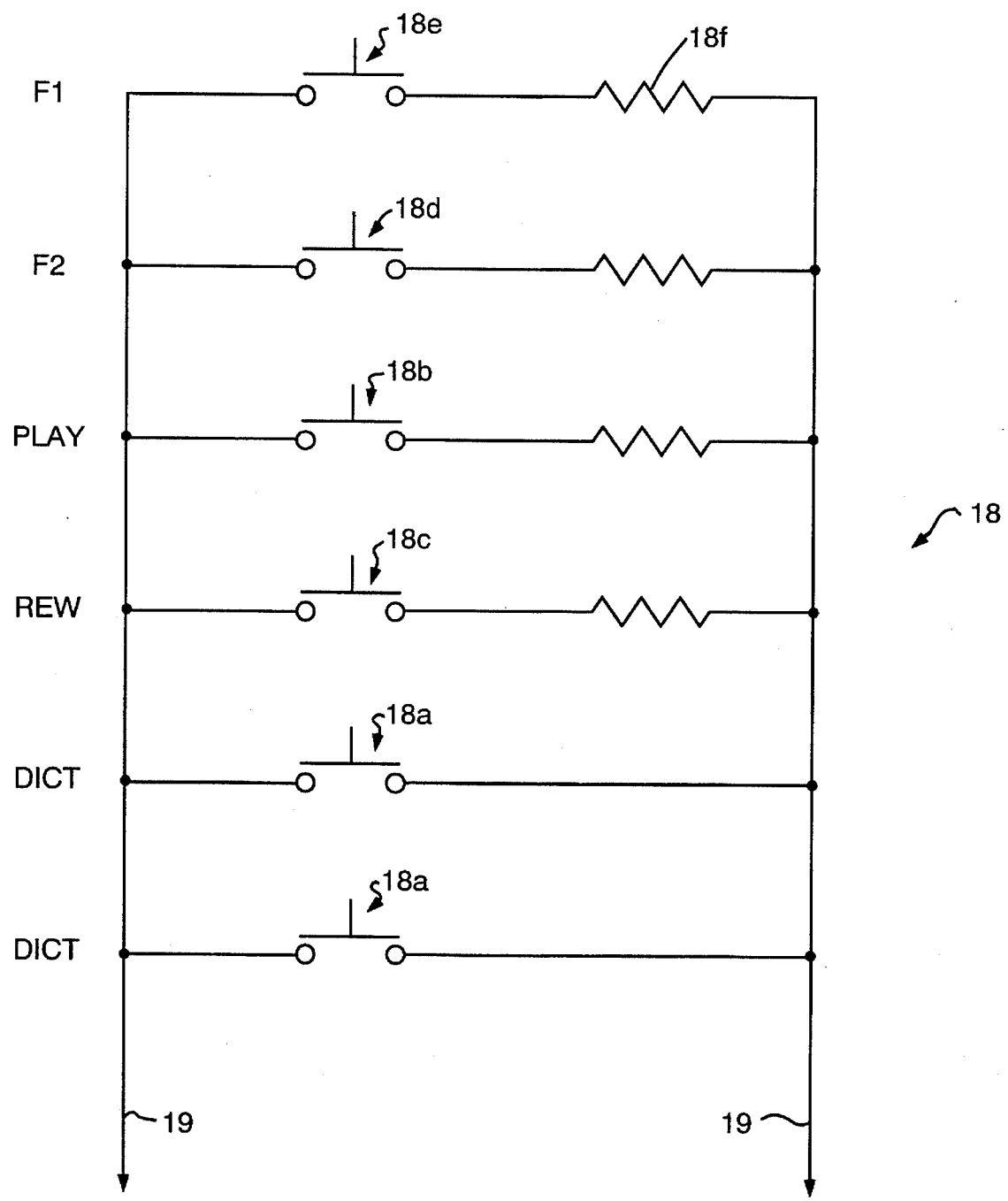
FIG. 3 is a schematic diagram of an auxiliary keypad.

As shown in FIG. 3, the buttons 18a are connected directly between the conductors 19 that connect the switch pad to the keypad interface 60 (FIG. 4). The buttons 18b–18e, on the other hand, are connected in series with resistors 18f, each of which has a different value. The keypad interface 60 senses the change in resistance between the conductors 19 from the open circuit condition to detect actuation of one of the buttons and ascertains which of the buttons has been actuated. For example, the interface 60 may include a fixed resistor and voltage source (not shown) connected in series with the keypad 18, with an analog-to-digital converter connected to sense the voltage between the conductors 19 and provide a corresponding digital output. The interface may include further circuitry for converting the analog-to-digital converter output to a standardized code representing the keypad button and passing that code to the microprocessor 44. The microprocessor in turn converts the code to a command that is passed over the I/O bus 58 to the signal generator 76. The signal generator 76 generates tone signal(s) that are passed to the interface unit 72, which in turn passes the tone signal(s) to the central recording unit over the telephone line.

A signal decoder 78 receives DTMF signals from the base unit 12 by way of the interface unit 72 when the control unit is in the program mode. The interface unit 72 sends corresponding digital signals to the microprocessor 44 over the I/O bus 58 as described below.

Figure 5A:
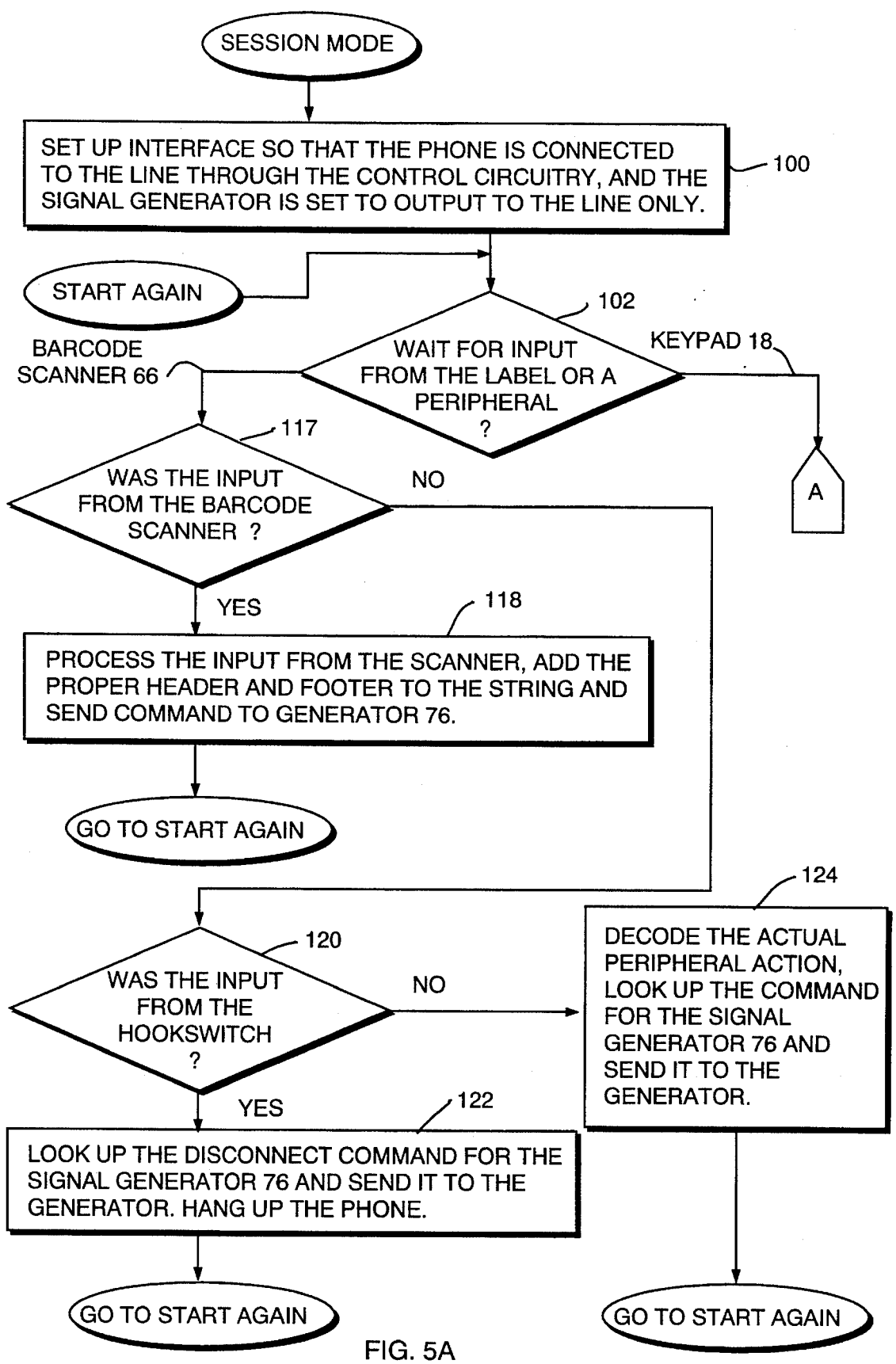
FIGS. 5A–5B are simplified flowcharts illustrating the steps taken by the control unit while a user uses the invention to interact with a central recording unit, i.e. while the terminal is in session mode.
Figure 5B:
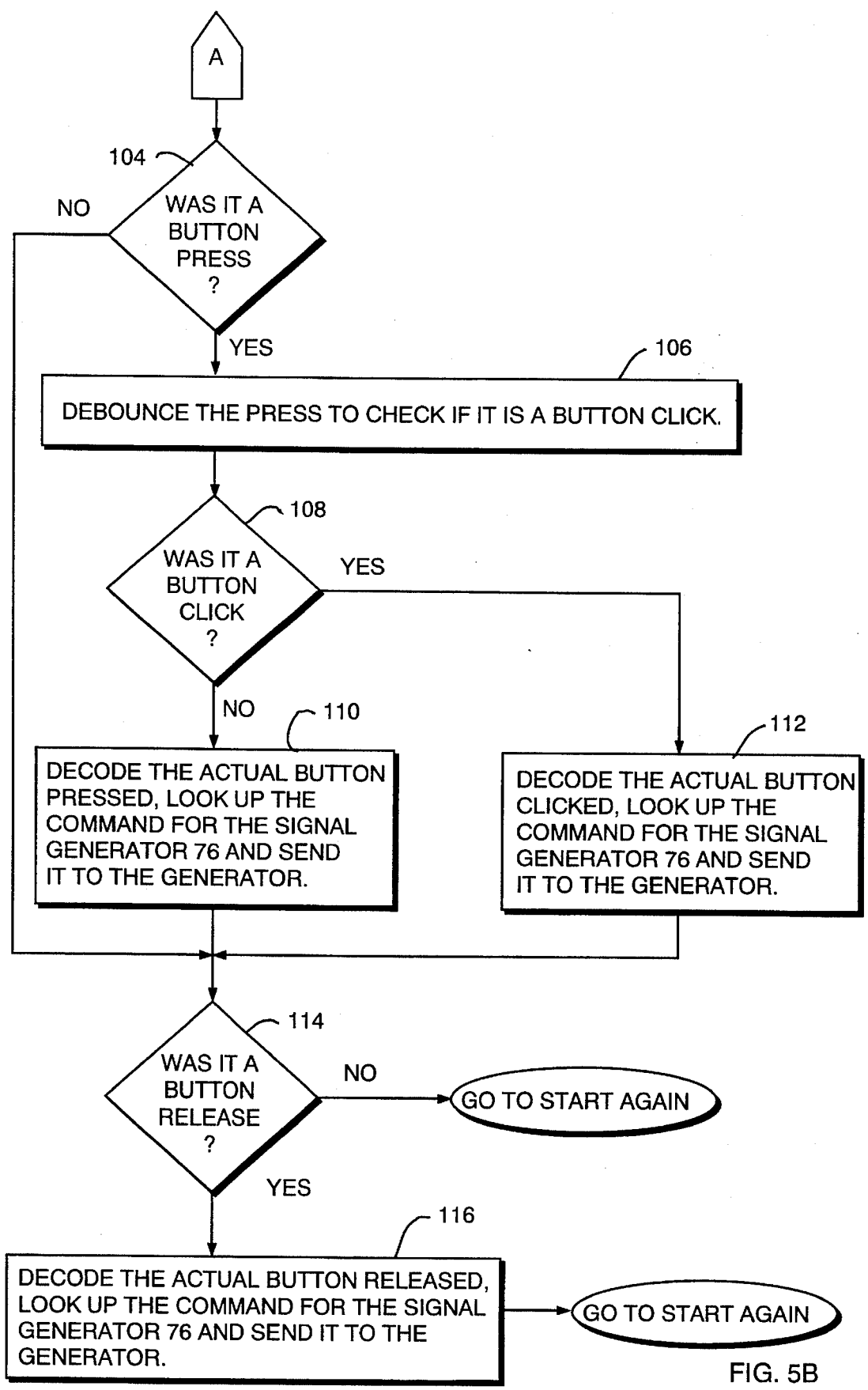
Figure 6A:
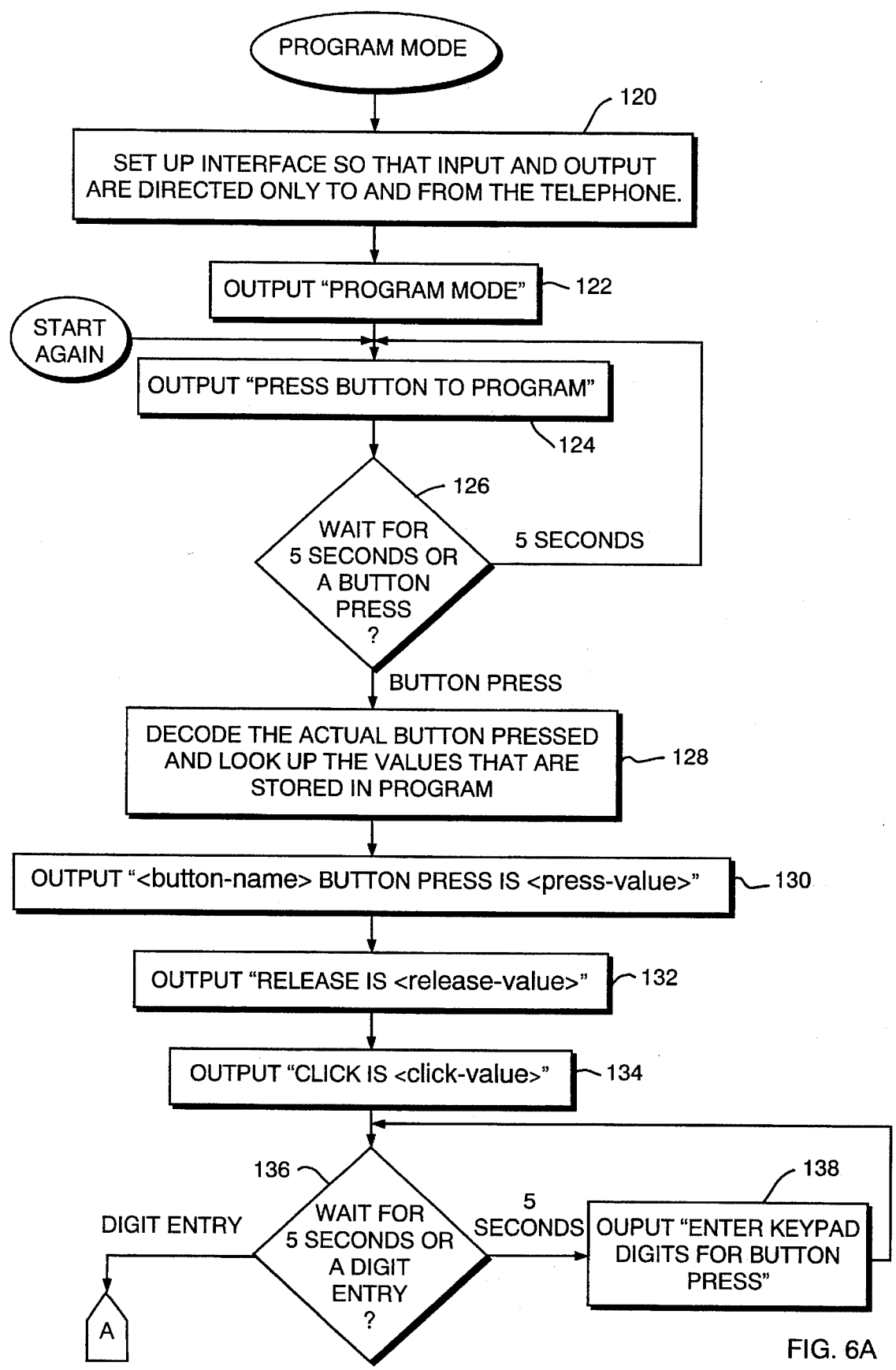
FIGS. 6a–6d are simplified flowcharts illustrating the steps taken by the control unit while a user programs the terminal unit.
Figure 6B:
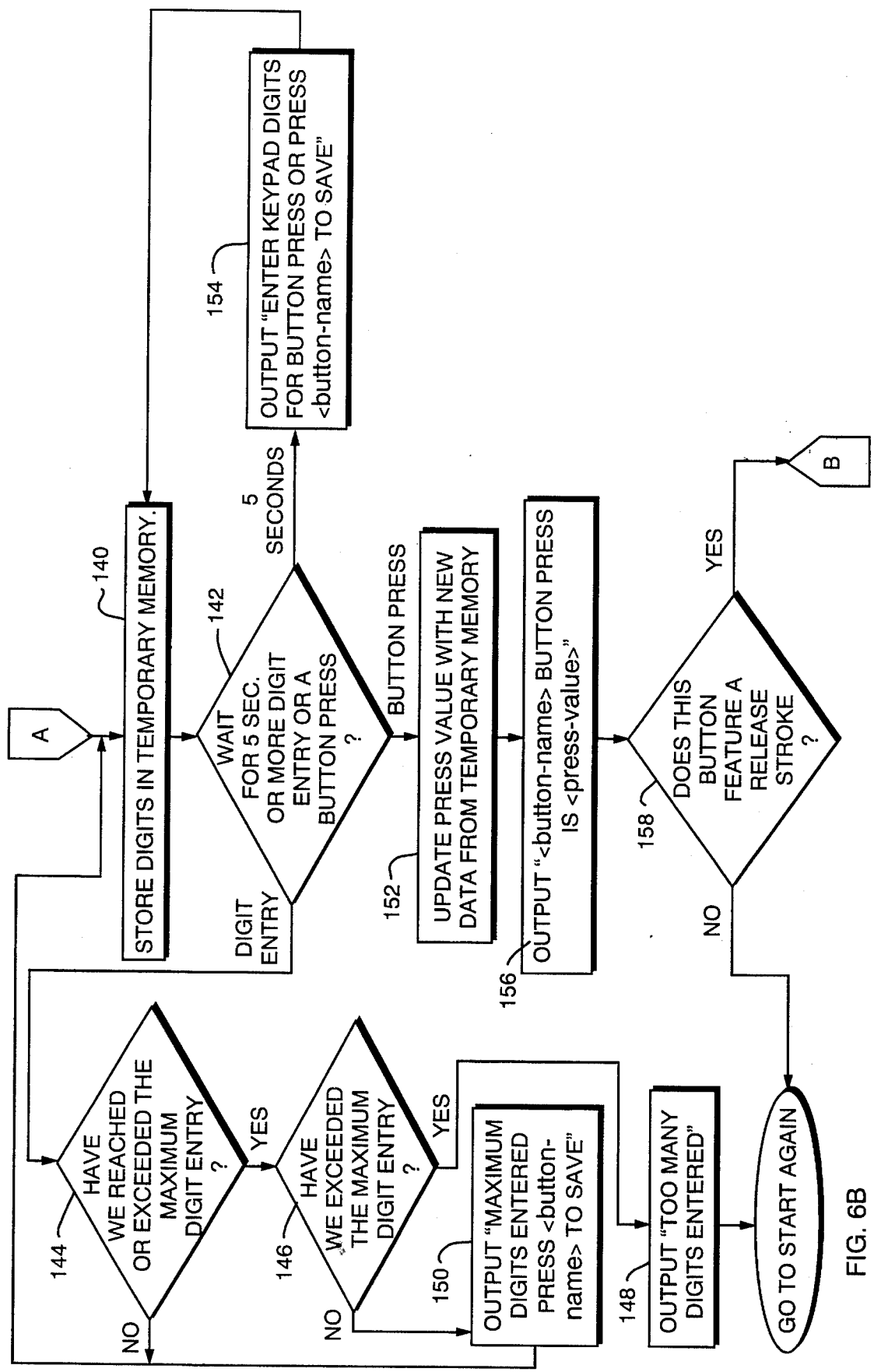
Figure 6C:
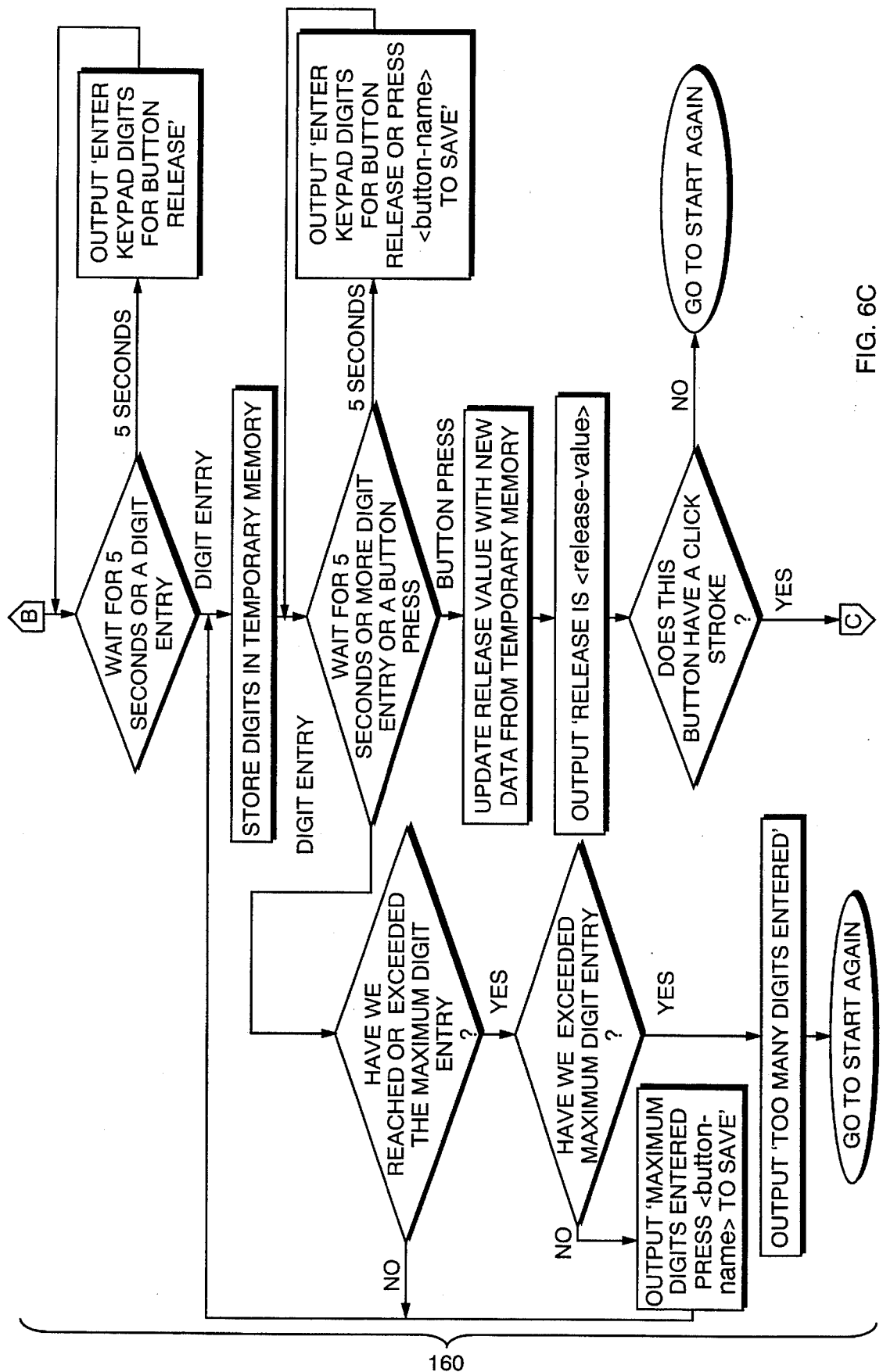
Figure 6D:
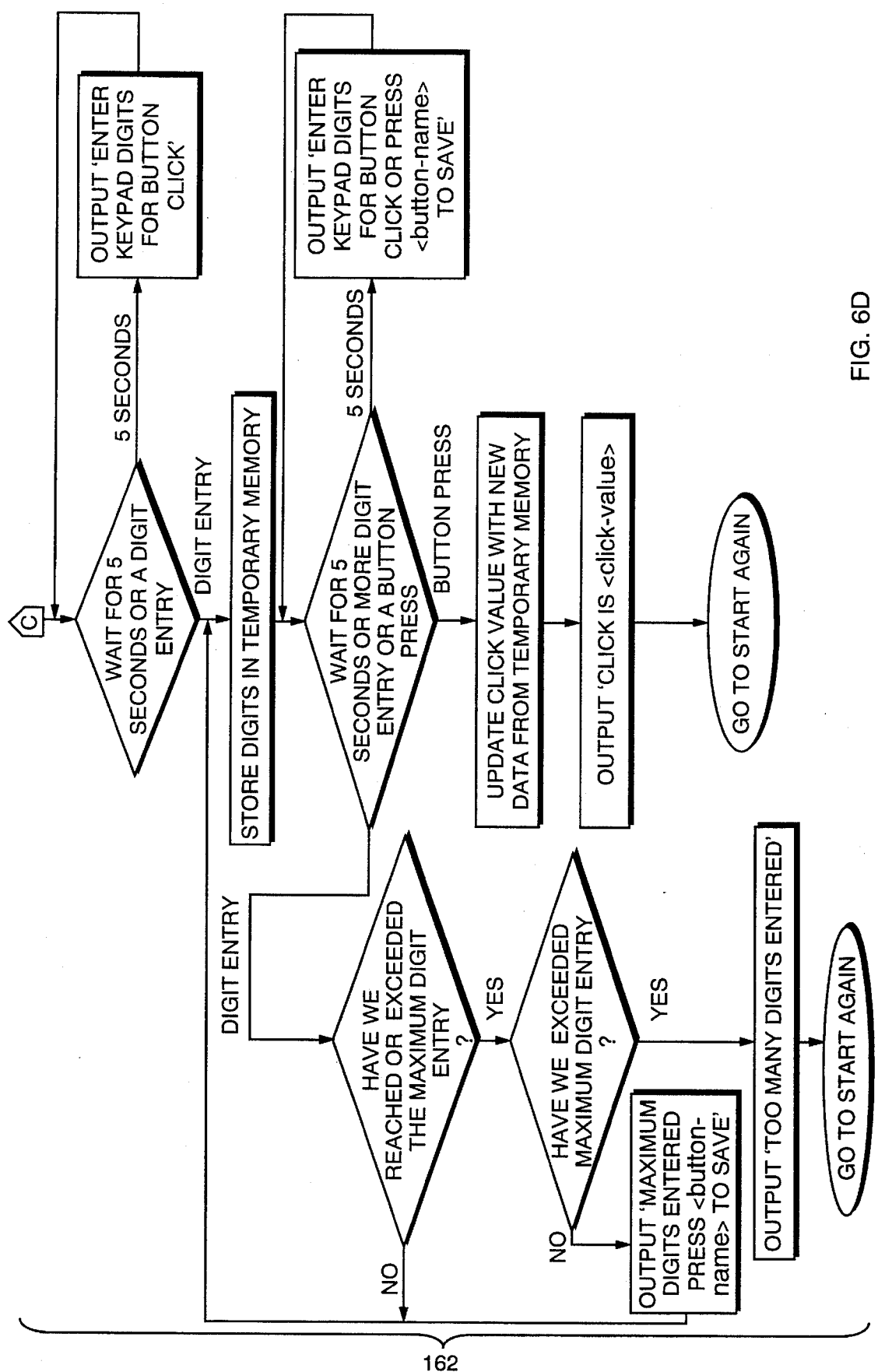

FIGS. 5A–5B illustrate the operation of the control unit 14 when the appropriate switch 40 is activated to select the session mode for the recording or playback session with the central recording unit. Under control of firmware in the read-only memory 48, the microprocessor 44 initially sets up the interface unit 72 to connect the telephone base unit 12 to the telephone line 36 and to transmit the output of the signal generator 76 only to the line 36 (box 100). The microprocessor 44 then waits for an input at one of the input ports 52 (FIG. 4) as indicated at 102.

If the input is from the keypad 18, the microprocessor 44 next ascertains whether the input indicates whether or not a keypad button was pressed, as indicated at 104. If a button was pressed, the microprocessor applies a debounce routine 106 to the input from the keypad interface unit 60 to determine whether the action was a button "click", i.e. a momentary actuation of the button, or a sustained actuation of the button (called a button "press"), as indicated at 108. As indicated in the boxes 110 and 112, in either case the microprocessor 44 decodes the input from the keypad interface unit 60 to determine which button was pressed or clicked. It then looks up the corresponding command for the signal generator 76 and sends the command to the signal generator. The signal generator responds by transmitting the corresponding tone signal(s) to the central recording unit.

The program next passes to the decision point 114 which, if the input from the keypad interface 60 indicated a button press, returns control to the block 102. If the action was a button release, operation passes to the block 116 in which again the microprocessor decodes the keypad button that was released, looks up the command for the release of that button, and sends it to the signal generator 76 which again sends the corresponding tone signal(s) to the central recording unit. Operation then passes to block 102.

If the input is from a peripheral, decision block 102 passes control to decision block 117, which invokes the operation of block 118 if the input was from the bar code scanner 66. As indicated in the latter block, the microprocessor 44 processes the input from the scanner, adds header and footer information and sends the appropriate command to the signal generator 76 to transmit corresponding tone signal(s) to the central recording unit. If the input was not from the bar code scanner, the block 117 invokes a decision at block 120. Control then passes to the block 122 if the input was from the hook switch. In that case the microprocessor 44 looks up the disconnect command and sends it to the signal generator 76, which in turn sends the corresponding tone signal(s) to the central recording unit. The resulting transmission from the generator 76 provides the central recording unit with an immediate signal that the session has ended. The microprocessor 44 then commands the line sense and disconnect unit 74 to disconnect from the telephone line 36. Operation then returns to the block 102.

If the input was not from the hook switch, the decision at block 120 invokes the operation of block 124. The microprocessor 44 then just decodes the peripheral action, looks up the corresponding command for the signal generator 76 and sends the command to the signal generator. The signal generator, in turn, sends the corresponding tone signal(s) to the central recording unit. Operation then returns to the block 102.

FIGS. 6A–6D illustrate the operation of control unit 14 when the appropriate switch 40 is activated to select the program mode, in which the user can change any of the tone signal(s) for button press, button release or button click for any of the buttons on the keypad 18. In this mode, the microprocessor initially sets up the interface unit 72 so that the audio driver 70, signal generator 76 and signal decoder 78 are connected to the telephone base unit 12 and the base unit is disconnected from the line sense and disconnect unit 74 as indicated at the box 120. Accordingly when the user removes the handset 10 from the base unit 12, an off-hook signal is not transmitted over the telephone line 36. As indicated at 122, the microprocessor 44 then sends to the audio generator 68 the appropriate command to cause the audio generator to send the voice message "program mode" to the user. In this connection, it should be noted that in the flowchart the quotation marks indicate voice messages transmitted by the audio generator 68. In order to program a new "press" value for a keypad button, the user will press the keypad button and then press a series of one or more buttons on the dial of the telephone. The user will then similarly program a new "release" value for the same keypad button. The user will then similarly program a new "click" value for the same keypad button. As indicated by the box 124, the microprocessor 44 causes a prompt "press button to program" to be transmitted and, as indicated at 126, it waits five seconds for the user to actuate one of the buttons on the keypad 18. If no button is pressed during that interval, operation returns to the box 124. However, if a button is pressed, the microprocessor decodes the button and looks up the corresponding press, release and click values, which are stored in the non-volatile RAM 50. These values represent the tone signal(s), i.e. the simulated series of button presses on a telephone dial, that the invention sends to a central recording unit in response to a user pressing, releasing, or clicking the corresponding auxiliary keypad button. The microprocessor then causes these values (as names of telephone dial buttons, e.g. "1", "5", and "*") to be announced to the user as indicated at 130, 132 and 134. The user then commences to redefine the value of a keypad button press by pressing the corresponding button(s) on the dial on the telephone base unit 12. The corresponding analog signals (tones) from the base unit are decoded by the decoder 78 and fed back to the microprocessor 44 by way of the I/O bus 58. If the user fails to enter the first digit within five seconds, as indicated at 136, the microprocessor 44 causes a voice reminder to be transmitted as indicated at 138 and then returns to the decision point 136.

When the first digit has been entered, the microprocessor stores it in the RAM 46 as indicated at 140 and then waits for the second and successive digits as indicated at 142. With each digit that is entered, a decision is made as indicated at 144 depending on whether the maximum number of digits has been entered. If not, operation returns to the block 140. If the maximum number of digits has been exceeded, block 146 passes operation to the block 148. An appropriate message is transmitted to the user and operation then returns to the block 124. If the number of digits is exactly the maximum number, the user is prompted to press the corresponding button on the keypad 18 as indicated at 150 and when the user does so, the decision at 142 passes control to the block 152. The string of digits that was stored in the RAM 46 is then entered in the non-volatile RAM 50, replacing the previous value that was stored in that memory.

If, during the sequence in which the digits representing the button press are entered, there is a pause of five seconds, the microprocessor prompts the user with a message to use a keypad digit or to repress the previously selected button on the keypad 18, as indicated at 154. As set forth in the box 156, the user is then prompted with a message indicating that the selected button now has the value that has been entered by the user. Next the microprocessor 44 checks to see whether the selected button has a value for release of the button as, indicated at 158. If not, operation returns to the block 124. If it does, the microprocessor enters a routine collectively indicated at 160, to enter and record a value for the button release. This routine is the same as the routine involved in entering and recording the value for the button push. Finally, operation passes to a routine collectively indicated at 162 involving the entry of a value for click of the selected button. Operation then returns to the block 124. The program mode can be terminated at any time by activating a switch 40 (FIG. 1) to switch to another mode.

Figure 7:
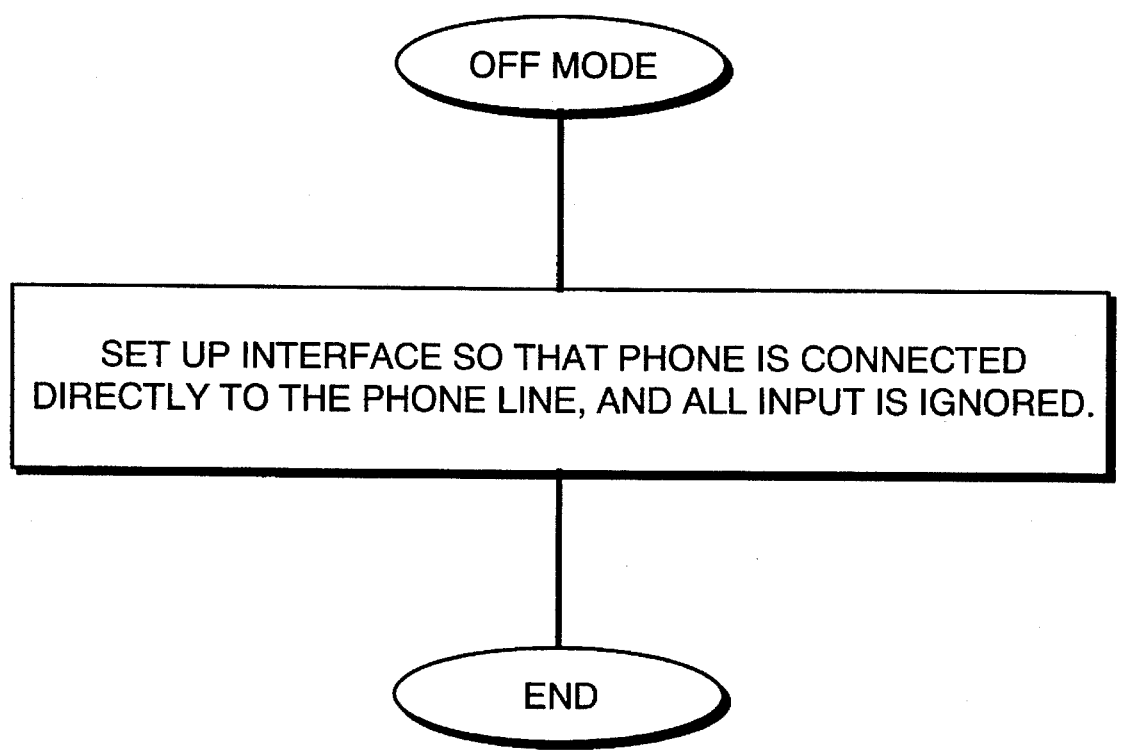
FIG. 7 is a simplified flowchart illustrating the steps taken by the control unit while it is in an off mode.

The third mode of operation, i.e. the off mode, is illustrated in FIG. 7. In that mode the microprocessor 44 simply sets up the interface unit 72 and the line sense and disconnect unit 74 so that the telephone is connected directly to the telephone line 36 and all inputs on the telephone dial and the keypad 18 are ignored by the microprocessor 44.

The same arrangement can be used, with some modification, with digital telephones. In those telephones, the signals between the telephone and the telephone line 36 are in digital form. However, the analog signals from the handset 10 are converted to digital form in the base unit 12 and similarly incoming digital representations of voice signals are converted to analog form in the base unit 12 and sent on to the handset 10. The control unit is therefore connected to send signals to and receive signals from the line between the handset 10 and the base unit 12. As illustrated in FIG. 4, the interface unit 72 is connected to the conductors 73 interconnecting the jacks 22 and 26. The interface unit 72 can therefor interpose the control unit electrically between the handset 10 and the base unit 12. An impending on-hook condition may be sensed by adhering a thin switch pad to the hook switch on the base unit 12. Thus, when the user "hangs up" the telephone, this action is sensed by the microprocessor 44 by means of the thin film switch before the hook switch has been depressed to the point where the telephone has gone on-hook. The control unit can therefor send a corresponding disconnect signal to the central recording unit as described above in connection with the analog-telephone version of the invention.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A terminal unit for communicating voice and control signals with a host unit over a telephone line, the terminal unit comprising:
   A. a telephone having a base unit and a handset,
   B. a control unit comprising
      1) a keypad on said handset and actuatable by a user holding said handset,
      2) an interface unit including means for sensing actuation of keys on said keypad and transmitting corresponding tone signals over said telephone line,
   C. means for holding said telephone line and
   D. means for responding to an on-hook condition of said telephone by transmitting a predetermined code over said line to said host unit and then disconnecting said terminal from said line.

2. A terminal for use in communicating between a central voice recording and retrieval unit and a remote recording and retrieval location by means of a telephone network, the terminal comprising:
   A. a telephone unit comprising
      1) a base unit connectable to a telephone line of the network,
      2) a handset connectable to the base unit, and
      3) DTMF buttons for generation of DTMF dialing signals,
   a control unit comprising
      1) an interface unit connected between the headset and the base unit,
      2) a signal generator,
      3) control switches actuatable by a user of the terminal,
      4) a read/write memory for storing the relationship between the actuation of respective ones of said control switches and the output of said signal generator,
      5) means for controlling the signal generator in accordance with the actuation of said control switches and the contents of said memory,
      6) mode switch means,
      7) means responsive to said mode switch means for providing
         (a) a first mode of operation in which actuation of said control switches causes communication of corresponding outputs of said signal generator over the telephone line and
         (b) a second mode in which operation of said control switches and said DTMF buttons store said relationships in said memory.

3. The terminal defined in claim 2 including means responsive to an on-hook actuation of the telephone unit to communicate an on-hook signal to the central unit prior to the transmission of an on-hook condition to the telephone network.

\* \* \* \* \*